(12) United States Patent
Hauck et al.

(10) Patent No.: US 9,486,948 B2
(45) Date of Patent: Nov. 8, 2016

(54) METHOD FOR PRODUCING INTERIOR LINING PARTS IN A FOAMING TOOL

(75) Inventors: Axel Hauck, Herxhgm (DE); Bernd Keller, Karlsruhe (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 374 days.

(21) Appl. No.: 13/983,954

(22) PCT Filed: Feb. 3, 2012

(86) PCT No.: PCT/EP2012/000743
§ 371 (c)(1),
(2), (4) Date: Sep. 3, 2013

(87) PCT Pub. No.: WO2012/107245
PCT Pub. Date: Aug. 16, 2012

(65) Prior Publication Data
US 2013/0337232 A1    Dec. 19, 2013

(30) Foreign Application Priority Data
Feb. 7, 2011    (DE) .......................... 10 2011 010 881

(51) Int. Cl.
*B29C 44/12* (2006.01)
*B29C 44/34* (2006.01)
(Continued)

(52) U.S. Cl.
CPC ............. *B29C 44/12* (2013.01); *B29C 43/003* (2013.01); *B29C 44/1252* (2013.01); *B29C 44/1257* (2013.01); *B29C 44/351* (2013.01);
(Continued)

(58) Field of Classification Search
None
See application file for complete search history.

(56) References Cited

U.S. PATENT DOCUMENTS 4,089,919 A * 5/1978 Sanson .................. B29C 51/28
264/259

(Continued)

FOREIGN PATENT DOCUMENTS

DE    3434366 A1    8/1985
DE    19643563 A1    4/1998

(Continued)

OTHER PUBLICATIONS

"International Application No. PCT/EP2012/000743, English Translation of International Preliminary Report on Patentability mailed Aug. 22, 2013", (Aug. 22, 2013), 10 pgs.

(Continued)

*Primary Examiner* — Monica Huson
(74) *Attorney, Agent, or Firm* — Schwegman Lundberg & Woessner, P.A.

(57) ABSTRACT

The invention relates to a method for producing interior lining parts in a foaming tool, to an interior lining part produced accordingly, and to a foaming tool which can be used for production. The interior lining part has at least one molded skin, at least one foam layer and at least one carrier, the foam layer being located between the molded skin and the carrier. In order to produce an interior lining part according to the invention, the molded skin is introduced into a mold of a foaming tool. The foaming tool contains at least one separating edge. During back-foaming, the carrier is pressed against the molded skin at the position of the separating edge and connected to said molded skin such that a molded skin end can be severed manually, that is without the aid of tools, from the molded skin or is severed by the pressing step.

9 Claims, 3 Drawing Sheets

Figure 1:
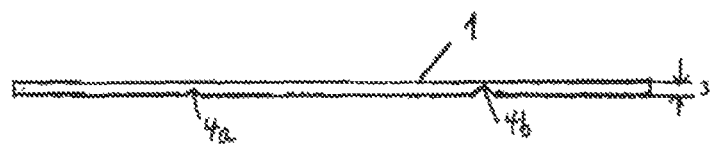

(51) Int. Cl.
*B29C 43/00* (2006.01)
*B29L 31/30* (2006.01)
*B29K 75/00* (2006.01)

(52) U.S. Cl.
CPC .... *B29K2075/00* (2013.01); *B29L 2031/3041* (2013.01); *Y10T 428/24496* (2015.01)

(56) References Cited

U.S. PATENT DOCUMENTS

| | | | | |
|---|---|---|---|---|
| 5,154,872 | A * | 10/1992 | Masui | B29C 43/02 264/266 |
| 5,238,640 | A * | 8/1993 | Masui | B29C 43/184 264/266 |
| 5,593,631 | A * | 1/1997 | Hara | B29C 43/184 264/257 |
| 6,136,415 | A * | 10/2000 | Spengler | B29C 44/569 264/46.6 |
| 6,207,090 | B1 * | 3/2001 | Knisely | B29C 43/021 264/138 |
| 7,208,213 | B1 * | 4/2007 | Ulmer | B29C 44/56 280/728.3 |
| 2010/0279051 | A1 * | 11/2010 | Pokorzynski | B29C 43/18 428/43 |
| 2012/0038082 | A1 * | 2/2012 | Burger et al. | 264/259 |

FOREIGN PATENT DOCUMENTS

| | | |
|---|---|---|
| DE | 19916023 A1 | 10/1999 |
| DE | 29917856 U1 | 12/1999 |
| DE | 19956338 A1 | 5/2001 |
| DE | 102009013065 A1 | 9/2010 |
| DE | 102009054893 A1 | 6/2011 |
| FR | 1602792 A | 1/1971 |
| FR | 2827805 A1 | 1/2003 |
| FR | 2947221 A1 | 12/2010 |
| WO | WO-2010083959 A1 | 7/2010 |
| WO | WO 2010105780 A1 * | 9/2010 ............. B29C 45/14 |

OTHER PUBLICATIONS

"International Application No. PCT/EP2012/000743, International Search Report and Written Opinion mailed Jun. 25, 2012", (Jun. 25, 2012), 15 pgs.

* cited by examiner

METHOD FOR PRODUCING INTERIOR LINING PARTS IN A FOAMING TOOL

PRIORITY CLAIM TO RELATED APPLICATIONS

This application is a national stage application under 35 U.S.C. §371 of PCT/EP2012/000743, filed Feb. 3, 2012, and published as WO 2012/107245 A1 on Aug. 16, 2012, which claims priority to German Application No. 10 2011 010 881.5, filed Feb. 7, 2011, which applications and publication are incorporated by reference as if reproduced herein and made a part hereof in their entirety, and the benefit of priority of each of which is claimed herein.

The present invention relates to a method for producing interior trim parts in a foaming tool, to a correspondingly produced interior trim part as well as to a foaming tool usable for the production.

Interior trim parts for installation in motor vehicles are produced using different processes. Interior trim parts inter alia have a molded skin which faces the passenger cabin of a vehicle after installation of the interior trim part and which is connected to a carrier and was back-foamed. Molded skins which are manufactured, for example, by a sintering process and which in this case are also called slush skins are inserted into a foaming tool for this purpose and are pressed with the carrier during the back-foaming. Since the molded skin has dimensions which are larger than dimensions of the carrier, a part of the molded skin, the so-called molded skin flap or slush skin flap, remains which projects beyond the carrier. This flap has to be cut off from the molded skin before a further use of the interior trim part, which takes place by a manual cutting into the molded skin flap using a knife, a pair of scissors or another cutting tool and by tearing off the flap cut in this manner by an exertion of force. The use of cutting tools is disadvantageous in this process since tool wear and an increased rejection rate in the event of incorrect cutting or of ragged tearing are hereby present, on the one hand, and a time loss is also present in the operation of the foaming tool and an increased risk of injury for the operator is present.

It is thus the underlying object of the present invention to develop a method for producing interior trim parts in a foaming tool as well as to develop an interior trim part produced using this method and a foaming tool which avoids the named disadvantages.

This object is achieved in accordance with the invention by a method having the features of claim 1 and by an interior trim part in accordance with claim 7 and a foaming tool in accordance with claim 8. Advantageous further developments are described in the dependent claims.

A method in accordance with the invention for producing an interior trim part which has at least one molded skin, at least one foam layer and at least one carrier comprises a plurality of steps. In a first step, the molded skin is positioned in the foaming tool, with the foaming tool having at least one separating edge which serves the introduction of a defined reduction in a thickness of the molded skin along a cutting line. A "defined reduction" is to be understood such that the thickness of the molded skin is larger in an unworked state than after a connection to the carrier. A difference between the original thickness and the thickness of the molded skin then obtained is defined by its amount and is influenced by the height of the separating edge.

In the second step, a carrier is introduced into the foaming tool and is pressed toward the separating edge covered by the molded skin at the position of the cutting line. The molded skin is back-foamed with a foam in this process. The molded skin and the carrier are connected to one another along the cutting line by the pressing and a foam-impermeable seal is produced as a hard seal at this position. The residual thickness at the position of the cutting line become so small by the pressing that a part of the molded skin which projects over dimensions of the carrier, the molded skin flap, can be separated from the part of the molded skin connected to the carrier by hand using a small exertion of force, that is also by physically weaker persons, for example, and without the assistance of tools, or it is already separated from the molded skin connected to the carrier by the pressing. In the last step, the produced interior trim part is removed from the foaming tool and the molded skin flap is separated manually, as described, provided that the separating edge has not already effected a complete separation of the molded skin flap. If a complete separation of the molded skin flap was achieved by the separating edges, the molded skin flap remains in the foaming tool, whereas the interior trim part is removed.

A method in accordance with the invention has the advantage that cutting tools are no longer required since the molded skin flap can be separated by hand, for which purpose a much lower exertion of force is required than on a tearing off after a cutting using a cutting tool or separation has already taken place by the manufacturing process. The risk of injury is hereby reduced due to the omission of cutting tools and the production becomes less expensive since reject rates are reduced, not costs are incurred for cutting tools and the time loss in the separation of the molded skin flap likewise becomes less.

In an embodiment, the separating edge can be configured for pressing in at least one specific region and not peripherally. A single region of the molded skin can hereby be directly connected to the carrier without a region being terminated which is completely closed by a peripheral separating edge. The variability of the method is thus increased and a region-wise sealing is achieved.

In a further embodiment, the molded skin can be preweakened along the cutting line before the introduction into the foaming tool, preferably using a V-shaped groove. The manual removal of the molded skin flap is hereby facilitated since the molded skin can be separated more easily due to the preweakening at this position.

Provision can furthermore be made that the separating edge can be heated. It is achieved by this further development that, in addition to the mechanical reduction in the thickness of the molded skin, a thermal influence also takes place which assists a foam-impermeable connection between the molded skin and the carrier and facilitates the separation.

Provision can be made in an embodiment that the separating edge has a curved extent in at least one section. The interior trim part can hereby have different shapes and can be better adapted to the respective application purpose.

Provision can be made in a further embodiment that the separating edge is configured to penetrate at least 0.2 mm into the molded skin. An improved and more exactly adjustable reduction in the thickness of the molded skin can hereby take place, that is thus a simpler separation.

Provision can be made that the defined reduction of the molded skin thickness along the cutting line comprises a reduction by at least 50% of the original molded skin thickness, particularly preferably a reduction by at least 75% of the original molded skin thickness.

An interior trim part which was produced using a method in accordance with the invention according to one of the claims 1 to 6 can comprise at least one molded skin, at least one foam layer and at least one carrier, with the foam layer lying between the molded skin and the carrier and the molded skin and the carrier being connected to one another in a foam-tight manner along a cutting line by pressing. Such an interior trim can be produced less expensively by the use of a method in accordance with the invention since the time loss is reduced in production and the incorrect cuts are reduced.

The interior trim part advantageously has a defined reduction in a thickness of the molded skin along the cutting line which defined reduction is introduced by the separating edge.

A foaming tool for carrying out a method in accordance with the invention can have a separating edge which can be removably attached at different positions in the foaming tool and is thus suitable for a variable positioning of the cutting line.

Embodiments of the invention are shown in the drawings and will be explained in the following with reference to FIGS. 1 to 7.

Figure 2:
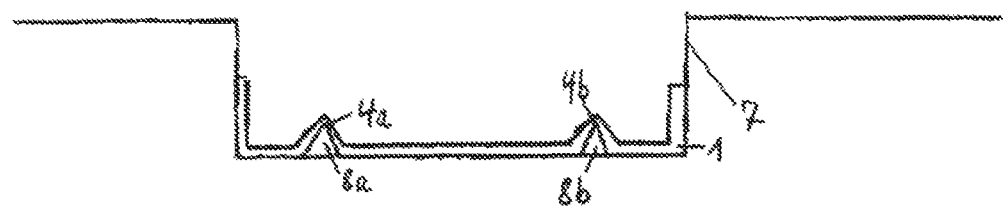
Figure 3:
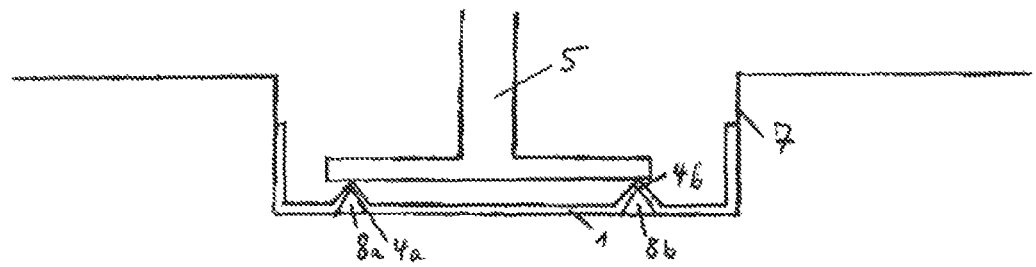
Figure 4:
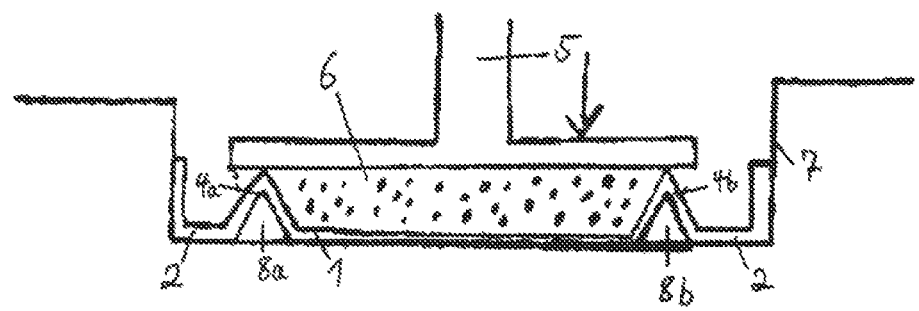
Figure 5:
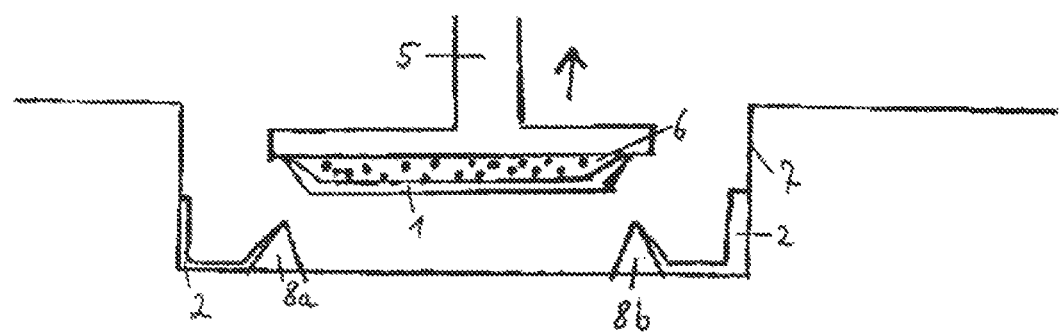
Figure 6:
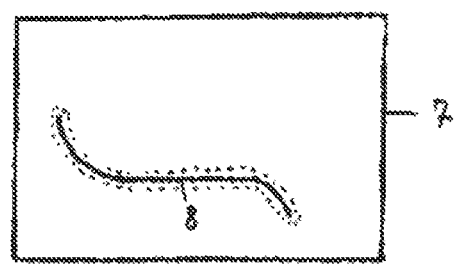

There are shown:

FIG. 1 a cross-sectional representation of a molded skin with an introduced preweakening;

FIG. 2 a cross-sectional representation of a foaming tool having two separating edges and an introduced molded skin;

FIG. 3 a representation of a foaming tool in accordance with FIG. 1 in which a carrier is being pressed toward the molded skin;

FIG. 4 a representation of a foaming tool in accordance with FIG. 3 in which a foam is introduced into the intermediate space located between the molded skin and the carrier;

FIG. 5 a representation of a foaming tool in accordance with FIG. 3 in which the interior trim part is removed from the foaming tool;

FIG. 6 a plan view of the foaming tool having a separating edge; and

Figure 7:
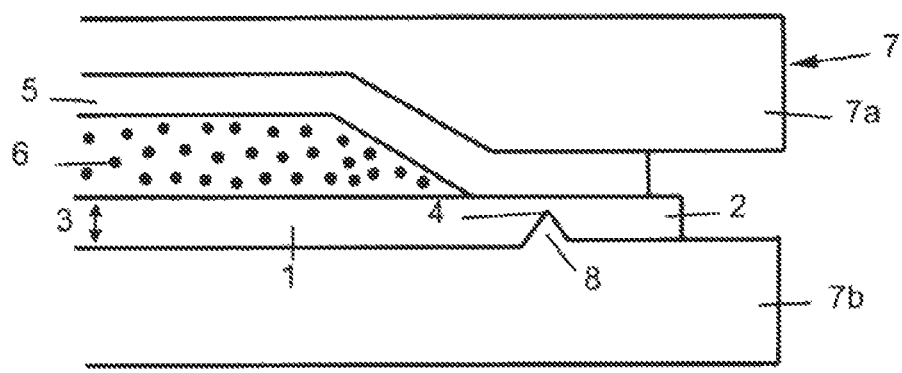

FIG. 7 a further embodiment of a foaming tool having a separating edge and having a molded skin and carrier placed into the foaming tool, with foam being introduced into the space between the molded skin and the carrier.

FIG. 1 shows a molded skin 1 with an already introduced preweakening in cross-section. The molded skin 1 is elastic and was manufactured by a rotational sintering method or slush method, but can also be produced by casting, deep-drawing or spraying. The molded skin 1 in the embodiment shown consists of polyvinyl chloride or another thermoformable material or comprises one of these materials. The molded skin 1 has a thickness of 1.2 mm in the embodiment shown. The grooves 4a and 4b are V-shaped in the embodiment shown, but can also have other shapes, for example rectangular or semicircular. The grooves 4a and 4b are spatially separate from one another and not connected to one another; however a throughgoing groove can also be provided in the molded skin 1. The preweakening, i.e. the remaining thickness of the molded skin 1 at the grooves 4a and 4b, is identical in the case shown, namely between 0.4 mm and 0.6 mm in dependence on the method used for the manufacture; however, a differently pronounced preweakening of the grooves can also be provided. The grooves 4a and 4b are introduced along the cutting line, with the cutting line being the line along which the molded skin 1 is to be connected to a carrier by a method in accordance with the invention. The thickness 3 of the molded skin 1 is admittedly reduced at the grooves 4a and 4b, but still sufficiently thick so as not to be able to manually cut through the molded skin 1. The molded skin 1 is equally thick at all sites outside the grooves 4a and 4b.

A mold 7 of a foaming tool is shown in cross-section in FIG. 2 into which mold the molded skin 1 shown in FIG. 1 was introduced. Identical elements are provided with identical reference numerals in this Figure and also in the following Figures. The molded skin 1 is in flush contact with a surface of the mold 7 of the foaming tool. The mold 7 in the embodiment shown has two separating edges 8a and 8b which are not connected to one another and are spatially separate from one another. The separating edges 8a and 8b can also be blades introduced into the molding tool. The separating edges 8a and 8b should serve for a region-wise pressing of the molded skin 1 to a carrier. The mold 7 can, however, also have a separating edge which can be configured as a peripheral separating edge, for example.

The separating edges 8a and 8b are of wedge-shaped design in the embodiment shown to effect a defined reduction in the molded skin thickness at the position of the cutting line which is defined by the separating edges 8a and 8b and which can also be called a tear line. In this respect, the part of the separating edges 8a and 8b contacting the grooves 4a and 4b has an angle of less than 60°. The height of the separating edges 8a and 8b is larger than the thickness 3 of the molded skin 1. The height of the separating edges 8a and 8b can, however, also be selected as smaller than the thickness 3 of the molded skin 1 if a less pronounced sealing effect is desired. In addition, the shape of the separating edges can also be semicircular or also have a different shape. The separating edges 8a and 8b are configured to penetrate at least 0.2 mm into the molded skin 1. A corresponding separating action is hereby exerted at this position in which the thickness 3 of the molded skin 1 is reduced by pressing together, that is by compression, of the molded skin 1 at this position and in which a separation is facilitated. This also includes the separating edges 8a and 8b have a height of at least 0.2 mm with respect to a surface of the mold 7. The height of the separating edges 8a and 8b does not have to be identical; different heights can also be used depending on the desired sealing effect. If the thickness 3 of the molded skin 1 at the position of the grooves 4a and 4b amounts to 0.4 mm, for example, the thickness 3 of the molded skin 1 is reduced by at least 50% of the original value by the separating edges 8a and 8b.

The molded skin 1 is positioned in the mold 7 such that the grooves 4a and 4b lie on the separating edges 8a and 8b. The separating edges 8a and 8b care fastened in the mold 7 in a removably attachable manner so that they can be adapted to different geometries and are heatable. A clamping mechanism is provided for the attachment; they can, however, also be screwed as an insert or can be fastened by a magnetic holding apparatus. The two separating edges 8a and 8b also do not have to be fastened in the mold 7 by the same fastening mechanism; different mechanisms can also be used for this purpose.

The dimensions of the molded skin 1 are larger than dimensions of a carrier to achieve a reliable connection between the molded skin 1 and the carrier. Remainders of the molded skin 1 projecting beyond the carrier are called a molded skin flap 2 and are separated from the part of the molded skin 1 connected to the carrier before a further processing of an interior trim part. The separating edges 8a and 8b comprise a heating coil for heating. Alternatively, the separating edges 8a and 8b can also not be heatable and/or can be introduced into the mold 7 in a stationary manner and not freely positionable. The separating edges 8a and 8b can also be milled together with the foaming tool or can be manufactured by a coating of the foaming tool, with the separating edges in this case no longer being removably attachable in the foaming tool.

FIG. 3 shows the mold 7 with an introduced molded skin 1 in accordance with FIG. 2, but now with a carrier 5 introduced into the mold 7. The carrier 5 is manufactured in an injection molding process and comprises polypropylene. The carrier 5 contacts the molded skin 1 at the positions elevated by the separating edges 8 and guided along the cutting line.

It is shown in FIG. 4 how the intermediate space between the molded skin 1 and the carrier 5 is filled by a foam 6, that is, is back-foamed. The foam 6 comprises a polyurethane foam. During the back-foaming, the carrier 5 is pressed toward the molded skin 1 and the separating edges 8a and 8b are heated. The pressing can take place by an upper part of the foaming tool not shown in FIG. 4. The molded skin 1 and the carrier 5 are connected to one another by the pressing at the position of the separating edges 8a and 8b and by the heat effect and a sealing is achieved at these positions which is not foam-permeable. In addition, the residual thickness of the molded skin 1 at the position of the separating edges 8a and 8b is reduced so much by the pressing that a molded skin flap 2 can be separated from the molded skin 1 connected to the carrier 5 by hand without making use of cutting tools. The data of the mold 7 used for a foaming process without a separating edge are taken over, but the separating edges 8a and 8b are designed at least 0.5 mm higher in comparison with the previous tool data to achieve a corresponding separating effect. This can be done by an adaptation of the height of the separating edges 8a and 8b of the foaming tool by a design engineer to ensure a cutting effect of the separating edges 8a and 8b. The tool data are in this respect based on product data of the foaming tool used.

Alternatively, the separating edges 8a and 8b can also not be heated during the pressing process. The already described sealing and reduction of the residual thickness of the molded skin 1 at the position of the separating edges 8a and 8b can likewise hereby be achieved.

The removal of an interior trim part which is formed from the molded skin 1, the carrier 5 and the interposed foam 6 is shown in FIG. 5. The interior trim part in the embodiment shown is a dashboard, but can also be a door trim or another part which can be installed in the passenger compartment of a motor vehicle. A foam-tight connection along the cutting line defined by the separating edges 8a and 8b was effected by the pressing at the separating edges 8a and 8b. After the foam 6 has fully reacted, a foam layer has formed and the carrier 5 and the molded skin 1 are connected to one another along the separating line, the interior trim part can be removed. In this respect, the molded skin flap 2 can be manually separated from the part of the molded skin 1 connected to the carrier 5 during the release or after it. The separation takes place in this respect along the cutting line at which the remaining residual thickness of the thickness 3 of the molded skin 1 was already set by the separating edges 8a and 8b such that the molded skin flap 2 can be simply pulled off by hand. The manual separation takes place without making use of tools since the thickness 3 of the molded skin 1 at the cutting line was preweakened so much that physically weaker persons can also separate the molded skin flap 2 by hand without any great exertion of force. Provided that the separating effect was large enough, the molded skin flap 2 can also already have been separated and remains in the foaming tool on the removal of the interior trim part.

In an alternative embodiment, which is not shown here, however, a plurality of molded skins can also be connected to one another in that they are laid over one another and are connected to one another at the position of the separating edges 8a and 8b.

A plan view of the mold 7 of a foaming tool is shown in FIG. 6. The separating edge 8 is placed in the mold 7 as an individual separating edge and has one straight and two curved sections. The separating edge 8 is connected to the mold 7 by a magnetic holder in the embodiment shown and comprises steel, but can also comprise aluminum and can be connected to the mold 7 in a removably attachable manner. Alternatively, the separating edge 8 can also be connected to the foaming tool without a possibility of removal. The dashed line indicates the outline of the separating edge 8 on the surface of the mold 7 which is introduced into the mold 7 of the foaming tool.

FIG. 7 represents a further embodiment of a foaming tool. The molded skin 1 is introduced into the mold 7 which comprises an upper part 7a and a lower part 7b in this representation. The molded skin 1 is in turn a skin produced by rotational sintering. The lower side 7b of the mold has the separating edge 8 which is fixedly connected to the lower side 7b since it was milled together with the tool. The molded skin 1 has the thickness 3 of 1.2 mm; in addition, a V-shaped groove 4 was already introduced into the molded skin 1 before the placing into the foaming tool. The molded skin 1 has a thickness of 0.4 mm at the position of the groove 4. The height of the separating edge 8 amounts to at least 0.2 mm in comparison with a surface of the lower side 7b, but is smaller than the thickness 3 of the molded skin 1. Before a closing of the mold 1, a carrier 5 manufactured by an injection molding process was applied onto the molded skin 1. The carrier 5 is pressed toward the molded skin 1 by the upper part 7a and in so doing achieved a connection and a seal at the position of the separating edge 8. Simultaneously with the pressing process, the space located between the carrier 5 and the molded skin 1 is filled with a foam 6, with a polyurethane foam in the embodiment. The part of the molded skin 1, the molded skin flap 2, projecting beyond the carrier 5 can be manually removed from the produced interior trim part after the end of the pressing and foaming. It is equally possible in an embodiment, not shown, to establish a weakening by correspondingly shaped separating edges, said weakening not taking place in a throughgoing manner, but only region-wise, preferably at regular intervals along the cutting line, so that the separation takes place along this perforated line.

Features of the different embodiments only disclosed in the embodiment examples can be combined with one another and claimed individually.

The invention claimed is:

1. A method for producing interior trim parts which have at least one molded skin, at least one foam layer and at least one carrier, comprising the following steps:
   a) positioning the molded skin in a mold of a foaming tool, wherein the mold has at least one separating edge for introducing a defined reduction of a thickness of the molded skin along a cutting line;
   b) introducing the carrier into the mold of the foaming tool and back-foaming the molded skin using a foam, wherein the molded skin is pressed toward the carrier at a position of the separating edge and is connected with the carrier and a sealing is achieved at this position, the sealing being not permeable for foam, wherein a residual thickness of the molded skin at this position is low enough that a part of the molded skin projecting beyond dimensions of the carrier can be separated from the part of the molded skin connected to the carrier by hand or by the pressing; and c) removing the interior trim part from the foaming tool and separating the part of the molded skin projecting beyond dimensions of the carrier.

2. The method in accordance with claim 1, wherein the separating edge is formed in at least one specific region and not peripherally to press the molded skin to the carrier.

3. The method in accordance with claim 1, wherein the molded skin is preweakened along the cutting line before the introduction into the foaming tool.

4. The method in accordance with claim 1, wherein the separating edge is heated.

5. The method in accordance with claim 1, wherein the separating edge has a curved extent in at least one section.

6. The method in accordance with claim 1, wherein the separating edge is configured to penetrate at least 0.2 mm into the molded skin to achieve a separating effect.

7. The method in accordance with claim 1 comprising producing an interior trim part comprising at least one molded skin, at least one foam layer and at least one carrier, wherein the foam layer is arranged between the molded skin and the carrier and wherein the molded skin and the carrier are connected to one another in a foam-tight manner along a cutting line by pressing, wherein the molded skin has a defined reduction in a molded skin thickness along the cutting line.

8. The method in accordance with claim 1, comprising using a foaming tool; wherein the separating edge is attachable in a removable manner at different positions in the foaming tool.

9. A method for producing interior trim parts that have at least one molded skin, at least one foam layer and at least one carrier, the method comprising:

a) positioning the molded skin in a mold of a foaming tool, wherein the mold has at least one heated separating edge that is configured to penetrate at least 0.2 mm into the molded skin for introducing a defined reduction of a thickness of the molded skin so as to be preweakened along a cutting line, wherein the separating edge has a curved extent in at least one section and is formed in at least one specific region and not peripherally to press the molded skin to the carrier;

b) introducing the carrier into the mold of the foaming tool and back-foaming the molded skin using a foam, wherein the molded skin is pressed toward the carrier at a position of the separating edge and is connected with the carrier and a sealing is achieved at this position, the sealing being not permeable for foam, wherein a residual thickness of the molded skin at this position is low enough that a part of the molded skin projecting beyond dimensions of the carrier can be separated from the part of the molded skin connected to the carrier by hand or by the pressing;

c) removing the interior trim part from the foaming tool and separating the part of the molded skin projecting beyond dimensions of the carrier; and d) providing a resulting interior trim part comprising at least one molded skin, at least one foam layer, and at least one carrier, wherein the foam layer is arranged between the molded skin and the carrier and wherein the molded skin and the carrier are connected to one another in a foam-tight manner along a cutting line by pressing, wherein the molded skin has a defined reduction in a molded skin thickness along the cutting line.

* * * * *